United States Patent
Motoike et al.

(10) Patent No.: US 10,426,179 B2
(45) Date of Patent: Oct. 1, 2019

(54) NON-LAURIC NON-TRANS FAT COMPOSITION FOR CHOCOLATE COATING

(71) Applicant: FUJI OIL COMPANY LIMITED, Osaka (JP)

(72) Inventors: Hideki Motoike, Osaka (JP); Tomoko Fujita, Osaka (JP)

(73) Assignee: FUJI OIL COMPANY LIMITED, Osaka (JP)

( * ) Notice: Subject to any disclaimer, the term of this patent is extended or adjusted under 35 U.S.C. 154(b) by 323 days.

(21) Appl. No.: 14/774,698

(22) PCT Filed: Mar. 14, 2014

(86) PCT No.: PCT/JP2014/056906
§ 371 (c)(1),
(2) Date: Sep. 10, 2015

(87) PCT Pub. No.: WO2014/148388
PCT Pub. Date: Sep. 25, 2014

(65) Prior Publication Data
US 2016/0066594 A1    Mar. 10, 2016

(30) Foreign Application Priority Data

Mar. 22, 2013 (JP) ................................. 2013-059811

(51) Int. Cl.
| | | |
|---|---|---|
| A23G 1/30 | (2006.01) | |
| A23D 9/007 | (2006.01) | |
| A23D 9/04 | (2006.01) | |
| A23D 9/00 | (2006.01) | |
| C11C 3/10 | (2006.01) | |
| A21D 13/28 | (2017.01) | |

(52) U.S. Cl.
CPC .............. *A23G 1/305* (2013.01); *A21D 13/28* (2017.01); *A23D 9/00* (2013.01); *A23D 9/007* (2013.01); *A23D 9/04* (2013.01); *C11C 3/10* (2013.01); *A23V 2002/00* (2013.01)

(58) Field of Classification Search
CPC .......... A23G 1/305; A23D 9/00; A23D 9/007; A23D 9/04; C11C 3/00; C11C 3/04; C11C 3/10; A21D 13/28
USPC ............ 426/293, 302, 305, 330.6, 601, 631
See application file for complete search history.

(56) References Cited

U.S. PATENT DOCUMENTS

| | | | | |
|---|---|---|---|---|
| 3,232,765 | A * | 2/1966 | Rosenthal | A23G 1/305 426/602 |
| 5,460,847 | A * | 10/1995 | Kawabata | A23G 1/305 426/631 |
| 2006/0105090 | A1* | 5/2006 | Cain | A23D 9/00 426/601 |

FOREIGN PATENT DOCUMENTS

| | | | | |
|---|---|---|---|---|
| CN | 101909457 | | 12/2010 | |
| CN | 102056493 | | 5/2011 | |
| EP | 2848127 A4 * | | 12/2015 | ............... A23D 9/00 |
| JP | 2005-507028 | | 3/2005 | |
| JP | 2007-319043 | | 12/2007 | |
| JP | 2010-532802 | | 10/2010 | |
| JP | 2012-249617 | | 12/2012 | |
| JP | 2012249617 A * | | 12/2012 | |
| WO | 2011/138918 | | 11/2011 | |
| WO | WO-2011161213 A1 * | | 12/2011 | ............... A23D 9/00 |
| WO | 2012/002373 | | 1/2012 | |

OTHER PUBLICATIONS

HLB system for Selecting Emulsifier, Jun. 12, 2007, 2 pages obtained from http://web.ist.utl.pt/ist11061/fidel/creac/sec36b.html.*
"Oleochemical Handbook (Yoshi Kagaku Binran)", revised 3rd edition, edited by Japan Oil Chemists' Society, published by Maruzen Co., Ltd. on Feb. 28, 1990, p. 105.
"International Search Report (Form PCT/ISA/210)", dated Jun. 24, 2014, with English translation thereof, pp. 1-2, in which three of the listed references (JP2012-249617A, "Oleochemical Handbook" and WO2012/002373A1) were cited.
"Office Action of China Counterpart Application," dated Jun. 13, 2018, with English translation thereof, p. 1-p. 13.

* cited by examiner

*Primary Examiner* — Jyoti Chawla
(74) *Attorney, Agent, or Firm* — JCIPRNET

(57) ABSTRACT

Provided is a non-lauric non-trans fat composition for chocolate coating that has the drying time, gloss, difficulty in peeling from a coated item, and sweating resistance required for chocolate coating use. Moreover, the non-lauric non-trans fat composition for chocolate coating enables a novel composite food having a soft texture that has not been obtainable by a conventional fat composition for chocolate coating to be obtained. The non-lauric non-trans fat composition for chocolate coating contains a fat having a specific fatty acid composition and having a rising melting point of 35° C. or higher, and has a specific triglyceride composition.

13 Claims, No Drawings

NON-LAURIC NON-TRANS FAT COMPOSITION FOR CHOCOLATE COATING

CROSS-REFERENCE TO RELATED APPLICATION

This application is a 371 of international application of PCT application serial no. PCT/JP2014/056906, filed on Mar. 14, 2014, which claims priority benefit of Japan Patent Application no. 2013-059811, filed on Mar. 22, 2013. The entirety of each of the above-mentioned patent applications is hereby incorporated by reference herein and made a part of this specification.

FIELD OF THE INVENTION

The invention relates to a non-lauric non-trans fat composition for chocolate coating. More specifically, the invention relates to a fat composition for chocolate coating having functions required for chocolate coating use and readily meltable in the mouth to provide a soft texture. The invention also relates to a chocolate using the fat composition and a composite food coated with the chocolate.

DESCRIPTION OF THE RELATED ART

Chocolate that contains fat compositions and saccharides is available on the market by being combined with various foods and utilized for various uses. One use is for coating surfaces of western confectionery such as cakes, puffs, and éclairs, etc., baked confectionery, Japanese confectionery, bakery products such as bread and doughnuts, etc., frozen dessert, and ice cream, etc.

Generally, in many cases, the chocolate for coating use preferably requires no tempering in view of convenience in use. Furthermore, in order to quickly move on to a conveyance or packaging step subsequent to coating, the chocolate is required to solidify at room temperature in a short time. In addition, after the solidification process, in order to increase people's desire to buy or eat the chocolate, visually, the chocolate is required to have good gloss and sufficient bloom resistance. Moreover, understandably, the chocolate is preferred to not easily peel from a coated item when eaten and to exhibit good meltability in the mouth and flavor.

A fat used in a fat composition for chocolate coating is obtained by suitably blending a lauric fat such as coconut oil, palm kernel oil or a hydrogenated oil of soybean oil, rapeseed oil, corn oil, palm oil or the like as a main component with other fat raw materials. Depending on season or environment where they are used, a wide variety of fat compositions are produced. So far, various studies have been made as to the chocolate using lauric fat or hydrogenated oil as the main component. As a result, lauric fat and fat having a high trans fatty acid content have been developed and commercialized. However, there is a possibility that the lauric fat may produce a soapy flavor during storage due to hydrolysis, and the trans fatty acid-containing fat has a problem that trans acid can pose risks to health from the viewpoint of recent nutrition. Therefore, non-tempering, non-trans and non-lauric confectionery fat for replacing the lauric fat and the trans fatty acid-containing fat is demanded.

With regard to the fat composition for chocolate coating having a low trans acid content and using no lauric fat, fat compositions obtained by fractionation after transesterification have been disclosed (in Patent Documents 1 to 4). Patent Documents 1 and 2 disclose a fat composition having bloom resistance and good gloss; Patent Document 3 discloses a fat composition that quickly dries at working temperature and that is unlikely to cause cracks or sweat as time passes; and Patent Document 4 discloses a fat composition excellent in processing suitability and capable of improving an appearance of a coated product.

PRIOR-ART DOCUMENTS

Patent Documents

Patent Document 1: Japanese Translation of PCT International Application Publication No. 2005-507028.
Patent Document 2: Japanese Translation of PCT International Application Publication No. 2010-532802.
Patent Document 3: Japanese Patent Publication No. 2007-319043.
Patent Document 4: International Publication No. WO2011/138918.

SUMMARY OF THE INVENTION

Problems to be Solved by the Invention

A coating chocolate that uses conventional non-lauric non-trans fat compositions for chocolate coating may have a hard texture or may easily peel from the coated item, and cannot satisfy all the functions required for the coating chocolate.

The coated item is usually one having a soft texture, such as a western confection, a baked confection, a Japanese confection, or a bakery product such as bread, doughnut or the like. If the coating chocolate has a soft texture, the texture of the coating chocolate and that of a composite food coated with the coating chocolate are integrated with each other, so that a novel composite food having a good texture can be created.

A method for softening the texture of the coating chocolate might be to blend the coating chocolate with a fat being liquid at room temperature. When the coating chocolate is blended with the fat being liquid at room temperature, the following consequences arise: occurrence of a so-called "sweating phenomenon" in which fat in a small granular shape appears on a surface of the coating chocolate, reduction in heat resistance of the coated product, and/or lengthening of drying time. There is also a fear that bloom resistance deteriorates due to such phenomena so that bloom occurs during a storage period from distribution to consumption. Therefore, to provide both functions of coating chocolate and a soft texture is a difficult problem that cannot be solved by the prior art alone.

An object of the invention is to provide a non-lauric non-trans fat composition for chocolate coating, wherein through a simple method, the non-lauric non-trans fat composition for chocolate coating attains the drying time, gloss, difficulty in peeling from a coated item, and sweating resistance required for coating use, and enables a novel composite food having a soft texture that has not been obtainable by a conventional fat composition for chocolate coating to be obtained.

Means for Solving the Problems

The inventors of this invention conducted various studies in order to solve the aforementioned problems, and completed this invention by preparing a fat composition that contains a fat having a specific fatty acid composition and having a rising melting point of 35° C. or higher, and that has a specific triglyceride composition.

Namely, the invention includes the following aspects.

(1) A fat composition for chocolate coating that contains a fat satisfying all the following requirements (A) to (E) and having a rising melting point of 35° C. or higher, and that satisfies all the following requirements (a) to (d):
(A) a content of C8-12 saturated fatty acids in a constituent fatty acid composition of the fat being 3 wt % or less;
(B) a content of C14-20 saturated fatty acids in the constituent fatty acid composition of the fat being 40 to 90 wt %;
(C) a content of C16-20 unsaturated fatty acids in the constituent fatty acid composition of the fat being 10 to 60 wt %;
(D) a content of C16 saturated fatty acids and C18 saturated fatty acids in the constituent fatty acid composition of the fat being 90 parts by weight or more relative to a total of 100 parts by weight of C8-22 saturated fatty acids; and
(E) a content of trans fatty acids in the constituent fatty acid composition of the fat being 3 wt % or less,
(a) an SSS content of 4 to 15 wt %;
(b) an S2U content of 50 wt % or less;
(c) an SU2+UUU content of 30 to 80 wt %; and
(d) a PPP+P2St content of 70 parts by weight or more relative to 100 parts by weight of SSS, wherein S represents a C16 or higher saturated fatty acid, U represents a C16 or higher unsaturated fatty acid, SSS represents a triglyceride in which three molecules of S are bound, S2U represents a triglyceride in which two molecules of S and one molecule of U are bound, SU2 represents a triglyceride in which one molecule of S and two molecules of U are bound, UUU represents a triglyceride in which three molecules of U are bound, P represents palmitic acid, St represents stearic acid, PPP represents a triglyceride in which three molecules of P are bound, and P2St represents a triglyceride in which two molecules of P and one molecule of St are bound;
(2) the fat composition for chocolate coating according to (1), wherein the fat having a rising melting point of 35° C. or higher includes one kind or two kinds of randomly transesterified fats and a content of the randomly transesterified fat is 60 wt % or more, and wherein the SSS content in (a) is 6 to 15 wt %, the S2U content in (b) is 10 to 45 wt %, and the SU2+UUU content in (c) is 40 to 70 wt %;
(3) the fat composition for chocolate coating according to (1) or (2), containing 0.1 to 3 mass % of an emulsifier having an HLB of 3 to 16;
(4) the fat composition for chocolate coating according to (3), wherein the emulsifier having an HLB of 3 to 16 is at least one or more selected from a group consisting of sucrose fatty acid ester, sorbitan fatty acid ester, and polysorbate;
(5) the fat composition for chocolate coating according to (1), containing the fat having a rising melting point of 35° C. or higher and a fat being liquid at room temperature, wherein the SSS content in (a) is 6 to 15 wt %, the S2U content in (b) is 7 to 35 wt %, and the SU2+UUU content in (c) is 40 to 70 wt %;
(6) the fat composition for chocolate coating according to (5), containing 0.1 to 3 mass % of an emulsifier having an HLB of 3 to 16;
(7) the fat composition for chocolate coating according to (5) or (6), wherein the SU2 content in (c) is 30 wt % or less and the UUU content in (c) is 10 wt % or more;
(8) the fat composition for chocolate coating according to (7), including 5 wt % or more of OOO as the UUU in (c), wherein O represents oleic acid, and OOO represents a triglyceride in which three molecules of O are bound;
(9) the fat composition for chocolate coating according to (5), wherein the fat having a rising melting point of 35° C. or higher is a randomly transesterified fat;
(10) the fat composition for chocolate coating according to (6), wherein the emulsifier having an HLB of 3 to 16 is at least one or more selected from a group consisting of sucrose fatty acid ester, sorbitan fatty acid ester, and polysorbate;
(11) the fat composition for chocolate coating according to any one of (1) to (10), wherein in a constituent fatty acid composition thereof, a content of trans fatty acids is 3 wt % or less, and a content of C8-12 saturated fatty acids is 3 wt % or less;
(12) a coating chocolate using the fat composition for chocolate coating according to any one of (1) to (11);
(13) a composite food coated with the coating chocolate according to (12);
(14) the composite food according to (13), wherein the composite food includes confectionery or bakery products; and
(15) a method for improving adhesiveness between a coating chocolate and a composite food using the coating chocolate according to (12).

Effects of the Invention

By preparing a fat composition that contains a fat having a specific fatty acid composition and having a rising melting point of 35° C. or higher and that has a specific triglyceride composition, it is possible to provide a non-lauric non-trans fat composition for chocolate coating that has functions required for coating use and that enables a novel composite food having a soft texture. Moreover, in a composite food obtained by coating a confection or a bakery product or the like with a coating chocolate that uses the fat composition for chocolate coating according to the invention, adhesiveness between the coating chocolate and the coated item is improved, difficulty in peeling the coating chocolate from the coated item that has not been achieved is realized, and a novel soft texture can be obtained.

DESCRIPTION OF THE EMBODIMENTS

Hereinafter, the invention is described in more detail. A fat composition for chocolate coating according to the invention contains a fat satisfying all the following requirements (A) to (E) and having a rising melting point of 35° C. or higher. Moreover, in this specification, "rising melting point" refers to a value measured in accordance with the method prescribed in The JOCS Standard Methods for the Analysis of Fats, Oils and Related Materials.
(A) A content of C8-12 saturated fatty acids in a constituent fatty acid composition of the fat is 3 wt % or less.
(B) A content of C14-20 saturated fatty acids in the constituent fatty acid composition of the fat is 40 to 90 wt %.
(C) A content of C16-20 unsaturated fatty acids in the constituent fatty acid composition of the fat is 10 to 60 wt %.
(D) A content of C16 saturated fatty acids and C18 saturated fatty acids in the constituent fatty acid composition of the fat is 90 parts by weight or more relative to a total of 100 parts by weight of C8-22 saturated fatty acids.
(E) A content of trans fatty acids in the constituent fatty acid composition of the fat is 3 wt % or less.

The fat composition for chocolate coating according to the invention contains the fat having a rising melting point of 35° C. or higher, and satisfies all the following requirements (a) to (d).

(a) An SSS content is 4 to 15 wt %.
(b) An S2U content is 50 wt % or less.
(c) An SU2+UUU content is 30 to 80 wt %.
(d) A PPP+P2St content is 70 parts by weight or more relative to 100 parts by weight of SSS,
wherein S represents a C16 or higher saturated fatty acid, U represents a C16 or higher unsaturated fatty acid, SSS represents a triglyceride in which three molecules of S are bound, S2U represents a triglyceride in which two molecules of S and one molecule of U are bound, SU2 represents a triglyceride in which one molecule of S and two molecules of U are bound, UUU represents a triglyceride in which three molecules of U are bound, P represents palmitic acid, St represents stearic acid, PPP represents a triglyceride in which three molecules of P are bound, and P2St represents a triglyceride in which two molecules of P and one molecule of St are bound.

In the fat having a rising melting point of 35° C. or higher, the content of C14-20 saturated fatty acids in the constituent fatty acid composition in (B) is preferably 45 to 75 wt %, and more preferably 45 to 70 wt %.

In the fat having a rising melting point of 35° C. or higher, the content of C16-20 unsaturated fatty acids in the constituent fatty acid composition in (C) is preferably 25 to 55 wt %, and more preferably 30 to 55 wt %.

In addition, in the fat having a rising melting point of 35° C. or higher, the content of C16 saturated fatty acids and C18 saturated fatty acids in the constituent fatty acid composition in (D) is 92 parts by weight or more relative to the total of 100 parts by weight of C8-22 saturated fatty acids.

If the SSS content in the fat composition for chocolate coating according to the invention is less than 4 wt %, for the most part, heat resistance is reduced; if the SSS content exceeds 15 wt %, meltability in the mouth and peeling resistance deteriorate. If the S2U content exceeds 50 wt %, a soft texture cannot be obtained anymore. If the SU2+UUU content is less than 30 wt %, the gloss on the coated surface is reduced, and cracks or peeling easily occurs; if the SU2+UUU content exceeds 80 wt %, the "sweating phenomenon" occurs, the heat resistance deteriorates, and the drying time is lengthened.

In addition, if the PPP+P2St content relative to 100 parts by weight of SSS is less than 70 parts by weight, i.e., if the PPP+P2St content is reduced and the content of StStSt or a higher-melting triglyceride is increased, the meltability in the mouth or coating suitability (sweating resistance and peeling resistance) deteriorates. In addition, if the content of a triglyceride containing a medium chain to short chain fatty acid that has a shorter chain length than P (palmitic acid) is increased, the solidification speed is slowed, and the heat resistance is reduced.

The fat having a rising melting point of 35° C. or higher preferably has palm oil as a main component. The fat having a rising melting point of 35° C. or higher may not be one kind of fat but may be a blend of two or more kinds of fats. It is more preferred that palm-based fat is contained in an amount of 50 wt % or more, even more preferably 70 wt % or more, and most preferably 80 wt % or more. Examples of the palm-based fat include palm oil, processed fats such as hydrogenated oil, fractionated oil, hydrogenated fractionated oil, fractionated hydrogenated oil or the like that uses palm oil as a raw material, and a mixed fat of the above, etc.

The fat composition for chocolate coating according to the invention has, as a main component, the fat satisfying all the aforementioned requirements (A) to (E) and having a rising melting point of 35° C. or higher. However, the effects of the invention may also be obtained by blending the fat composition for chocolate coating according to the invention with other fats as long as the fat composition for chocolate coating according to the invention satisfies all the aforementioned requirements (a) to (d). Examples of usable fats include: vegetable fats, such as soybean oil, sunflower seed oil, cottonseed oil, peanut oil, rice bran oil, corn oil, safflower oil, olive oil, kapok oil, sesame oil, evening primrose oil, palm oil, palm kernel oil, coconut oil, and medium chain triglyceride (MCT), etc.; animal fats, such as milk fat, beef tallow, and lard, etc.; processed fats obtained by subjecting the above fats to hydrogenation, fractionation, both hydrogenation and fractionation, and transesterification, etc.; and mixed fats of the above, etc.

In the fat composition for chocolate coating according to the invention, it is preferred that one kind or two kinds of randomly transesterified fats are contained as the fat having a rising melting point of 35° C. or higher in an amount of 60 wt % or more. Moreover, it is preferred that the SSS content in (a) is 6 to 15 wt %, the S2U content in (b) is 10 to 45 wt %, and the SU2+UUU content in (c) is 40 to 70 wt %. The SU2+UUU content in (c) is more preferably 40 to 60 wt %, and even more preferably 40 to 50 wt %. The content of the one kind or two kinds of randomly transesterified fats as the fat having a rising melting point of 35° C. or higher is more preferably 70 wt % or more, and even more preferably 80 wt % or more. It is most preferred to use only the randomly transesterified fat having a rising melting point of 35° C. or higher as the fat composition for chocolate coating.

In addition, in another embodiment of the fat composition for chocolate coating according to the invention, a fat being liquid at room temperature is contained in addition to the fat having a rising melting point of 35° C. or higher. Moreover, it is preferred that the SSS content in (a) is 6 to 15 wt %, the S2U content in (b) is 7 to 35 wt %, and the SU2+UUU content in (c) is 40 to 70 wt %. It is more preferred that the SU2 content is 30 wt % or less, and the UUU content is 10 wt % or more. It is even more preferred that OOO is contained as UUU in an amount of 5 wt % or more. In addition, the fat having a rising melting point of 35° C. or higher is preferably a randomly transesterified fat.

Transesterification methods are classified into two methods: a method (1,3-position-specific transesterification) of specifically exchanging only the fatty acid bound at position 1 and position 3 of a triglyceride using an enzyme (lipase), and a non-specific exchange method (random transesterification) with no regard to binding site using an enzyme or a metal catalyst (e.g., sodium methylate). In this invention, "transesterification" preferably refers to the latter, namely random transesterification. The reason is that more triglyceride species are obtained, so as to be excellent in maintaining quality of untempered chocolate over a long period of time.

The fat composition for chocolate coating obtained by the above method is used in a coating chocolate. In this invention, the coating chocolate refers to a fat-processed food in which a fat forms a continuous phase, and examples thereof include coating chocolates for coating or covering a surface of a confection, a bakery product or the like.

In addition, the "chocolates" mentioned herein are not limited to the chocolate defined by the Japan Fair Trade Council of Chocolate Industry and the Japan Fair Trade Council of Chocolate-Utilizing Foods, quasi chocolate and chocolate-utilizing foods, but also include fat-processed foods that have fats as an essential component and that utilize cacao mass, cocoa, cocoa butter, cocoa butter equivalent, and hard butter, etc.

A composite food coated with the coating chocolates in the invention is not particularly limited as long as being a confection or a bakery product. Examples of confections include manju (bun with a bean-jam filling), steamed youkan (adzuki-bean jelly), castella (Japanese sponge cake), dorayaki (bean-jam pancake), Imagawayaki (Japanese muffin filled with bean jam), taiyaki (fish-shaped pancake filled with bean jam), kintsuba (sword guard-shaped pancake filled with bean jam), waffle, chestnut manju, moon cake, bolo, yatsuhashi (sweet filled with red bean paste), rice cracker, karinto (fried dough cookie), sponge cake, Swiss roll, angel cake, pound cake, baumkuchen, fruitcake, madeleine, cream puff, éclair, mille-feuille, apple pie, tart, biscuit, cookie, cracker, steamed bread, pretzel, wafer, snack food, pizza pie, crepe, soufflé, and baignet, etc., or confections in which fruit such as banana, apple or strawberry, etc. is coated with chocolate. Examples of bakery products include sandwich bread, hot dog bun, fruit bread, corn bread, butter-enriched roll, hamburger buns, doughnut, baguette, bread roll, sweet roll, sweet dough, hardtack, muffin, bagel, croissant, Danish pastry, and naan, etc. Frozen dessert may also be used. However, normal-temperature use is preferred in order to obtain the effects of the invention.

A method for producing the coating chocolate of the invention can be carried out by a procedure for producing general chocolates. Specifically, the coating chocolate can be obtained by using the aforementioned fat composition for chocolate coating as an essential component, and suitably selecting raw materials such as various powdered foods such as saccharides, cacao mass, cocoa butter, and milk powder, etc., emulsifiers, flavoring agents, and pigments, etc. and mixing the same, and subjecting the mixture to roll application and conching.

The amount of the fat composition for chocolate coating of the invention used is 10 to 65 wt %, preferably 10 to 50 wt %, and more preferably 15 to 45 wt % relative to the entire chocolate. If the amount of the fat composition is less than 10 wt %, characteristics such as the solidification speed suitable for coating use and the gloss after solidification, or the difficulty in peeling from the coated item when eaten may not be achieved. If the amount exceeds 65 wt %, while the aforementioned characteristics can be achieved, a good flavor as the coating chocolate may not be obtained. In addition, an oily feeling is increased, which is not preferable.

In the invention, the fat being liquid at room temperature refers to a fat being liquid at 20° C. The term liquid means a state in which flowability is present, and the fat is usable despite precipitation of a few crystals. The fat is transparent with no crystal precipitation at 20° C., which is preferable. Examples of the fat being liquid at 20° C. used in the invention include: vegetable fats, such as rapeseed oil, soybean oil, sunflower seed oil, cottonseed oil, peanut oil, rice bran oil, corn oil, safflower oil, olive oil, kapok oil, sesame oil, evening primrose oil, palm oil, Shea fat, sal fat, and cacao fat, etc.; animal fats, such as fish oil, beef tallow, and lard, etc.; and low-melting fats obtained by subjecting the above fats to processing such as fractionation, transesterification or the like. Preferred examples include rapeseed oil, soybean oil, sunflower seed oil, cottonseed oil, peanut oil, rice bran oil, corn oil, safflower oil, olive oil and palm olein; more preferred examples include rapeseed oil, sunflower seed oil, rice bran oil, safflower oil, olive oil and palm olein; and most preferred examples include high oleic species such as rapeseed oil, sunflower seed oil and safflower oil, etc.

In the invention, it is preferred that an emulsifier having an HLB of 3 to 16 is contained in an amount of 0.1 to 3 wt % in view of texture. The addition amount of the emulsifier is more preferably 0.3 to 1 wt %. If too much emulsifier is added, physical properties as the coating chocolate are reduced. Preferred examples of the emulsifier include sucrose fatty acid ester, sorbitan fatty acid ester, and polysorbate. Two or more kinds thereof may be used in combination. Even if emulsifiers having different HLBs are used in combination, or sorbitan fatty acid ester and sucrose fatty acid ester are used in combination, as long as an HLB obtained from the weight ratio thereof is in the range of 3 to 16, such emulsifier is usable. In view of obtaining a soft texture suitable for coating use, it is most preferred to use sucrose fatty acid ester. Examples of constituent fatty acids of the fatty acid ester include C6-22 saturated or unsaturated fatty acids, such as lauric acid, myristic acid, palmitic acid, stearic acid, behenic acid, and oleic acid, etc.

EXAMPLES

Hereinafter, the invention is described in more detail by demonstrating examples. Moreover, in the examples, both "%" and "part" mean a weight basis.

(Production Method of Edible Fat A)

A fat having a fatty acid composition described in Table 1 was prepared. After the preparation, the fat was subjected to random transesterification using sodium methylate. The obtained transesterified oil was refined in accordance with a conventional method to obtain Edible fat A. Analysis values of Edible fat A are shown in Table 1. Moreover, Edible fat A was derived from palm oil and rapeseed oil.

(Edible Fat B)

Refined sunflower oil was used as Edible fat B. The analysis values are shown in Table 1.

(Edible Fat C)

Refined palm olein was used as Edible fat C. The analysis values are shown in Table (Edible Fat D)

Refined rapeseed oil was used as Edible fat D. The analysis values are shown in Table 1.

(Edible Fat E)

Refined soybean oil was used as Edible fat E. The analysis values are shown in Table (Production Method of Edible Fat F)

A blend oil (having an iodine value of 37) composed of 60 parts by weight of palm oil, 20 parts by weight of a palm fractionated high-melting part and 20 parts by weight of a palm highly hydrogenated oil was subjected to random transesterification using sodium methylate to obtain a randomly transesterified fat. The randomly transesterified fat was subjected to a two-stage fractionation using acetone to obtain a medium-melting part having an iodine value of 32 and a rising melting point of 40.0° C., and a low-melting part having an iodine value of 63. The obtained medium-melting part was refined in accordance with a conventional method to obtain Edible fat F. The analysis values of Edible fat F are shown in Table 1.

(Production Method of Edible Fat G)

An immobilized lipase "Lipozymes TL-IM" produced by Novozymes was used to produce a randomly transesterified fat by the following method.

First, a fat having the fatty acid composition described in Table 1 was prepared. After the preparation, the water content was adjusted to 100 ppm by dehydration under reduced pressure. Furthermore, 1 wt % of the "Lipozymes TL-IM" was added, and the resultant was stirred in a sealed vessel at a reaction temperature of 70° C. for 30 hours to perform transesterification, followed by removal of the immobilized lipase through filtration. The obtained randomly transesterified fat was refined in accordance with a conventional method to obtain Edible fat G. The analysis values of Edible fat G are shown in Table 1. Moreover, Edible fat G was derived from palm oil and rapeseed oil. The obtained Edible fat G had a solid fat content (SFC) at 20° C. of 23.0% and an SFC at 40° C. of 0. Moreover, a transesterification rate with the SFC at 20° C. calculated by the following method was 65%.

Transesterification rate (%)=($X_t$–$X_s$)/($X_f$–$X_s$)×100

Xs represents an SFC of a raw material compound oil at 20° C.
Xf represents an SFC at 20° C. at a reaction equilibrium value.
Xt represents an SFC of the obtained transesterified fat at 20° C.

The reaction equilibrium value is defined as follows. When the transesterification reaches equilibrium, the transesterification rate at the reaction equilibrium value is 100%.

All the SFC values were measured in accordance with IUPAC.2 150 SOLID CONTENT DETERMINATION IN FATS BY NMR.

(Adjusting Method for Vegetable Fat Parts in the Chocolate Composition)

By suitably blending Edible fat A to Edible fat G, the vegetable fat parts in the chocolate composition in the Examples and Comparative Examples were adjusted.

The rising melting points were measured in accordance with the method prescribed in 2.2.4.2 (Rising melting point) in The JOCS Standard Methods for the Analysis of Fats, Oils and Related Materials (1996 edition).

The fatty acid compositions of the fats were measured in accordance with the method prescribed in 2.4.1.2 (Preparation of Methyl Ester of Fatty Acids (Boron Trifluoride-Methanol Method)) in The JOCS Standard Methods for the Analysis of Fats, Oils and Related Materials (1996 edition). Moreover, Edible fat A to Edible fat G contained no C8-10 fatty acids.

chocolate to solidify at room temperature (20 to 25° C.) was measured. This time is called a "drying time."
  3 points: The time until the chocolate became not to adhere to fingers in all sites thereof was less than 10 min.
  2 points: The time until the chocolate became not to adhere to fingers in all sites thereof was not less than 10 min and less than 15 min.
  1 point: The time until the chocolate became not to adhere to fingers in all sites thereof was not less than 15 min.
(2) Evaluation of Appearance
  The appearance was evaluated by storing a chocolate product coated in (1) at 20° C. for 1 day and then observing its surface state.
  3 points: The surface had good gloss and was not sticky when touched. In addition, no sweating occurred.
  2 points: The surface had no gloss, or some sweating occurred.
  1 point: The surface was sticky when touched, or sweating occurred.
(3) Evaluation of Texture
  The texture was evaluated by storing the chocolate product coated in (1) at 20° C. for 1 day and then eating the same.
[Meltability in the Mouth]
  3 points: The meltability in the mouth was good and no aftertaste was felt.
  2 points: The meltability in the mouth was good and nearly no aftertaste was felt.
  1 point: The meltability in the mouth was bad and an aftertaste was felt.
[Peeling Resistance]
  3 points: The chocolate nearly did not peel off when eaten.
  2 points: The chocolate peeled off a little when eaten.
  1 point: The chocolate peeled off when eaten. (level of conventional products)
(4) Evaluation of Heat Resistance
  The chocolate product coated in (1) was stored at 20° C. for 1 day, then stored in a constant temperature chamber at 30° C. for 1 hour, and then stickiness of its surface was evaluated.

TABLE 1

| | C12 | C14 | C16 | C18 | C18:1 | C18:2 | C18:3 | C20 | C22 | C24 | Rising melting point | Iodine value |
|---|---|---|---|---|---|---|---|---|---|---|---|---|
| Edible fat A | 0.2 | 1.1 | 54.4 | 5.6 | 30.1 | 6.5 | 0.5 | — | 1.5 | — | 46.3° C. | 39.5 |
| Edible fat B | — | — | 4.1 | 4.0 | 80.8 | 9.5 | 0.9 | 0.7 | — | — | — | 85.2 |
| Edible fat C | 0.3 | 1.0 | 32.0 | 3.0 | 49.6 | 13.5 | 0.5 | 0.1 | — | — | 10° C. or less | 67.6 |
| Edible fat D | — | — | 4.4 | 2.0 | 60.8 | 20.6 | 9.2 | 1.9 | 0.7 | 0.1 | — | 114.3 |
| Edible fat E | — | — | 10.5 | 3.9 | 23.3 | 53.0 | 7.6 | 0.6 | 0.4 | 0.1 | — | 131.6 |
| Edible fat F | 0.1 | 1.0 | 51.3 | 15.9 | 26.6 | 4.3 | 0.1 | 0.6 | 0.2 | — | 40.0° C. | 32.5 |
| Edible fat G | 0.2 | 1.1 | 40.2 | 5.2 | 40.7 | 10.5 | 0.2 | 0.7 | 1.2 | — | 39.0° C. | 55.5 |

(Evaluation Method)
The evaluation was carried out in accordance with the following method.
(1) Evaluation of Drying Property
  The solidification speed of the coating chocolate was evaluated by the following method. After the chocolate was completely melted, the temperature was adjusted to 50° C., and the chocolate was coated on a commercially available doughnut or bread. The time for the 3 points: The surface was not sticky when touched.
  2 points: The surface was hardly sticky, but felt a little oily.
  1 point: The surface was sticky when touched.
(5) Overall Evaluation
  The overall evaluation was determined by averaging the evaluation points. In addition, an overall evaluation of 2.5 points or higher was determined as pass.

(6) Measurement of Hardness

The chocolate product melted at 50° C. was placed in a cup, and solidified at 20° C. for 1 day, followed by measurement by a FUDOH rheometer (made by RHEOTECH) using a 5 mm plunger.

Examples 1, 2, 3 and Comparative Examples 1, 2

Preparation of Fat

Preparation of the respective vegetable fat parts was carried out in accordance with the following compositions. However, Example 3 was prepared in the same composition as Example 1. The compositions of the fats, analysis results of the triglyceride compositions using an HPLC method, and the contents of trans acid and C12 are shown in Table 2.

TABLE 2

| | Blending amount (part) of vegetable fat | | | | Analysis value (%) | | | | | | | |
|---|---|---|---|---|---|---|---|---|---|---|---|---|
| | Edible fat A | Edible fat B | Edible fat F | Edible fat G | SSS | S2U | SU2 | UUU | OOO | PPP + P2St | Trans acid | C12 |
| Example 1 | — | — | — | 100.0 | 9.5 | 32.0 | 37.4 | 7.3 | 6.0 | 7.3 | 1% or less | — |
| Example 2 | 28.7 | — | 23.3 | 48.0 | 13.8 | 43.5 | 33.2 | 9.4 | 6.1 | 10.5 | | — |
| Comparative Example 1 | 72.7 | 27.3 | — | — | 16.0 | 29.3 | 20.4 | 21.9 | 19.8 | 15.2 | | — |
| Comparative Example 2 | 15.0 | 85.0 | — | — | 3.3 | 6.7 | 18.4 | 61.1 | 54.4 | 3.1 | | — |

(Trial Preparation of Chocolate)

Next, a trial preparation of chocolate was carried out by a conventional method in accordance with the following compositions.

The trial preparation was carried out in which Examples 1, 2 and Comparative Examples 1, 2 had the same composition except for a difference in the blended vegetable fat part, and Example 3 had the same composition as Example 1 except for whether or not sucrose fatty acid ester was present.

The chocolate obtained by the trial preparation was coated on a doughnut and evaluated in accordance with the aforementioned evaluation method.

Both Examples 1 and 2 that contained a randomly transesterified fat as the fat having a rising melting point of 35° C. or higher quickly hardened at nomial temperature, and had good appearance and meltability in the mouth. In addition, they had less peeling when eaten as compared to conventional products, and had no problem with heat resistance.

Example 3 had the same fat composition as Example 1, but was slightly inferior to Example 1 in appearance, meltability in the mouth and peeling resistance. Comparative Example 1 that contained 72.7 parts by weight of the fat having a rising melting point of 35° C. or higher and more than 15 wt % of SSS quickly hardened at normal temperature, but was inferior to the Examples in appearance, meltability in the mouth, peeling resistance and heat resistance. Comparative Example 2 that contained 15 parts by weight of the fat having a rising melting point of 35° C. or higher and less than 4 wt % of SSS hardly hardened at normal temperature and had low heat resistance, and was thus unsuitable for coating use. The chocolate compositions and the evaluation results are summarized in Table 3.

TABLE 3

| | Example 1 | Example 2 | Comparative Example 1 | Comparative Example 2 | Example 3 |
|---|---|---|---|---|---|
| Cocoa | 19.3 | ← | ← | ← | ← |
| Cacao mass | 5.2 | ← | ← | ← | ← |
| Sugar | 34.3 | ← | ← | ← | ← |
| Whole milk powder | 0.9 | ← | ← | ← | ← |
| Vegetable fat | 40.3 | ← | ← | ← | ← |
| Lecithin | 0.3 | ← | ← | ← | ← |
| Sucrose fatty acid ester (HLB = 7)*1 | 0.35 | ← | ← | ← | |
| Flavoring agent | 0.053 | ← | ← | ← | ← |
| Evaluation of drying property | 3 (6 min) | 3 (5 min) | 3 (6 min) | 2 (13 min) | 3 (2 min) |
| Evaluation of appearance | 3 | 3 | 2 | 1 | 3 |
| Evaluation of meltability in the mouth | 3 | 3 | 1 | 3 | 2 |
| Evaluation of peeling resistance | 3 | 2 | 1 | 3 | 2 |
| Evaluation of heat resistance | 3 | 3 | 3 | 1 | 3 |
| Overall evaluation (average) | 3.0 | 2.8 | 2.0 | 2.0 | 2.6 |

(Unit: part by weight)
*1Ester S770 produced by Mitsubishi Chemical Industries Co., Ltd.

Examples 4, 5, 6, 7 and Comparative Example 1

Preparation of Fat

Preparation of the respective vegetable fat parts was carried out in accordance with the following compositions. However, Example 7 was prepared in the same composition as Example 1. The compositions of the fats, analysis results of the triglyceride compositions using an HPLC method, and the contents of trans acid and C12 are shown in Table 4.

TABLE 4

|  | Blending amount (part) of vegetable fat | | | Analysis value (%) | | | | | | | |
|---|---|---|---|---|---|---|---|---|---|---|---|
|  | Edible fat A | Edible fat B | Edible fat C | SSS | S2U | SU2 | UUU | OOO | PPP + P2St | Trans acid | C12 |
| Example 4 | 62.8 | 37.2 | — | 13.8 | 25.4 | 20.0 | 28.7 | 25.7 | 13.1 | 1% or less | — |
| Example 5 | 67.7 | 32.3 | — | 14.9 | 27.3 | 20.2 | 25.3 | 22.8 | 14.1 |  | — |
| Example 6 | 62.8 | — | 37.2 | 14.0 | 33.7 | 33.9 | 7.3 | 4.5 | 13.3 |  | — |
| Comparative Example 1 | 72.7 | 27.3 | — | 16.0 | 29.3 | 20.4 | 21.9 | 19.8 | 15.2 |  | — |

(Trial Preparation of Chocolate)

Next, a trial preparation of chocolate was carried out by a conventional method in accordance with the following compositions.

The trial preparation was carried out in which Examples 4 to 6 and Comparative Example 1 had the same composition except for a difference in the blended vegetable fat part, and Example 7 had the same composition as Example 4 except for whether or not sucrose fatty acid ester was present.

The chocolate obtained by the trial preparation was coated on a doughnut and evaluated in accordance with the aforementioned evaluation method.

Both Examples 4 and 5 that contained a randomly transesterified fat as the fat having a rising melting point of 35° C. or higher quickly hardened at normal temperature, and had good appearance and meltability in the mouth. In addition, they had less peeling when eaten as compared to conventional products, and had no problem with heat resistance.

Example 6 that contained a randomly transesterified fat as the fat having a rising melting point of 35° C. or higher, more than 30 wt % of SU2 and less than 10 wt % of UUU quickly hardened at normal temperature, and had good appearance, meltability in the mouth and heat resistance. However, Example 6 was slightly inferior to Examples 4 and 5 in peeling resistance when eaten. Moreover, Examples 4, 5 and 6 contained, in addition to the fat having a rising melting point of 35° C. or higher, a fat being liquid at room temperature.

Comparative Example 1 that contained more than 15 wt % of SSS quickly hardened at normal temperature, but was inferior to the Examples in appearance, meltability in the mouth, peeling resistance and heat resistance. Example 7 had the same fat composition as Example 4, but was slightly inferior to Example 4 in appearance, meltability in the mouth and peeling resistance. The chocolate compositions and the evaluation results are summarized in Table 5.

TABLE 5

|  | Example 4 | Example 5 | Example 6 | Comparative Example 1 | Example 7 |
|---|---|---|---|---|---|
| Cocoa | 19.3 | ← | ← | ← | ← |
| Cacao mass | 5.2 | ← | ← | ← | ← |
| Sugar | 34.3 | ← | ← | ← | ← |
| Whole milk powder | 0.9 | ← | ← | ← | ← |
| Vegetable fat | 40.3 | ← | ← | ← | ← |
| Lecithin | 0.3 | ← | ← | ← | ← |
| Sucrose fatty acid ester (HLB = 7)*1 | 0.35 | ← | ← | ← |  |
| Flavoring agent | 0.053 | ← | ← | ← | ← |
| Evaluation of drying property | 3 (6 min) | 3 (4 min) | 3 (6 min) | 3 (6 min) | 3 (2 min) |
| Evaluation of appearance | 3 | 3 | 3 | 2 | 3 |
| Evaluation of meltability in the mouth | 3 | 2 | 3 | 1 | 2 |
| Evaluation of peeling resistance | 3 | 3 | 2 | 1 | 2 |
| Evaluation of heat resistance | 3 | 3 | 3 | 3 | 3 |
| Overall evaluation (average) | 3 | 2.8 | 2.8 | 2 | 2.6 |

(Unit: part by weight)
*1Ester S770 produced by Mitsubishi Chemical Industries Co., Ltd.

Examples 8 and 9

Preparation of Fat

Preparation of the respective vegetable fat parts was carried out in accordance with the following compositions. The compositions of the fats, analysis results of the triglyceride compositions using an HPLC method, and the contents of trans acid and C12 are shown in Table 6.

TABLE 6

| | Blending amount (part) of vegetable fat | | | Analysis value (%) | | | | | | | |
|---|---|---|---|---|---|---|---|---|---|---|---|
| | Edible fat A | Edible fat D | Edible fat E | SSS | S2U | SU2 | UUU | OOO | PPP + P2St | Trans acid | C12 |
| Example 8 | 62.8 | 37.2 | — | 13.8 | 25.1 | 17.8 | 30.9 | 11.7 | 13.1 | 1% or less | — |
| Example 9 | 62.8 | — | 37.2 | 13.8 | 26.6 | 20.0 | 21.4 | 3.5 | 13.1 | | — |

(Trial Preparation of Chocolate)

Next, a trial preparation of chocolate was carried out by a conventional method in accordance with the following compositions.

The trial preparation was carried out in which Examples 8 and 9 had the same composition except for a difference in the fat composition.

The chocolate obtained by the trial preparation was coated on a doughnut and evaluated by the aforementioned evaluation method.

Examples 8 and 9 contained, in addition to the fat having a rising melting point of 35° C. or higher, a fat being liquid at room temperature. Furthermore, Examples 8 and 9 contain 30 wt % or less of SU2 and 10 wt % or more of UUU.

Example 8 that contained 5 wt % or more of OOO quickly hardened at normal temperature, and had good appearance and meltability in the mouth. In addition, it had less peeling when eaten, and had no problem with heat resistance.

Example 9 that contained 3.5 wt % of OOO quickly hardened at normal temperature, and had good meltability in the mouth. However, regarding the appearance, some sweating occurred, and Example 9 was slightly inferior to Example 8 in heat resistance. The chocolate compositions and the evaluation results are summarized in Table 7.

TABLE 7

| | Example 8 | Example 9 |
|---|---|---|
| Cocoa | 19.3 | ← |
| Cacao mass | 5.2 | ← |
| Sugar | 34.3 | ← |
| Whole milk powder | 0.9 | ← |
| Vegetable fat | 40.3 | ← |
| Lecithin | 0.3 | ← |
| Sucrose fatty acid ester (HLB = 7)*1 | 0.35 | ← |
| Flavoring agent | 0.053 | ← |
| Evaluation of drying property | 3 (5 min) | 3 (6 min) |
| Evaluation of appearance | 3 | 2 |
| Evaluation of meltability in the mouth | 3 | 3 |
| Evaluation of peeling resistance | 3 | 3 |
| Evaluation of heat resistance | 3 | 2 |
| Overall evaluation (average) | 3 | 2.6 |

(Unit: part by weight)
*1Ester S770 produced by Mitsubishi Chemical Industries Co., Ltd.

Examples 10, 11 and 12

Trial Preparation of Chocolate

A trial preparation of chocolate was carried out by a conventional method in accordance with the following compositions.

The trial preparation was carried out in which Examples 10 to 12 had the same composition as Example 4 except for the type of the emulsifier. The chocolate obtained by the trial preparation was coated on a doughnut and evaluated in accordance with the aforementioned evaluation method.

Examples 10 to 12 quickly hardened at normal temperature, and had good appearance and meltability in the mouth. In addition, they had less peeling when eaten as compared to Example 7, and had no problem with heat resistance. As a result of measurement of hardness of the chocolate, Example 4 (using sucrose fatty acid ester) was the softest and the best. The chocolate compositions and the evaluation results are summarized in Table 8.

TABLE 8

| | Example 4 | Example 7 | Example 10 | Example 11 | Example 12 |
|---|---|---|---|---|---|
| Cocoa | 19.3 | ← | ← | ← | ← |
| Cacao mass | 5.2 | ← | ← | ← | ← |
| Sugar | 34.3 | ← | ← | ← | ← |
| Whole milk powder | 0.9 | ← | ← | ← | ← |
| Vegetable fat | 40.3 | ← | ← | ← | ← |
| Lecithin | 0.3 | ← | ← | ← | ← |
| Sucrose fatty acid ester (HLB = 7)*1 | 0.35 | | | | |
| Sucrose fatty acid ester (HLB = 3)*2 | | | 0.35 | | |
| Polysorbate (HLB = 15.7)*3 | | | | 0.35 | |

TABLE 8-continued

|  | Example 4 | Example 7 | Example 10 | Example 11 | Example 12 |
|---|---|---|---|---|---|
| Sorbitan fatty acid ester (HLB = 8)*4 |  |  |  |  | 0.35 |
| Flavoring agent | 0.053 | ← | ← | ← | ← |
| Evaluation of drying property | 3 (6 min) | 3 (2 min) | 3 (6 min) | 3 (3 min) | 3 (5 min) |
| Evaluation of appearance | 3 | 3 | 3 | 3 | 3 |
| Evaluation of meltability in the mouth | 3 | 2 | 2 | 3 | 2 |
| Evaluation of peeling resistance | 3 | 2 | 3 | 3 | 3 |
| Evaluation of heat resistance | 3 | 3 | 3 | 3 | 3 |
| Overall evaluation (average) | 3 | 2.6 | 2.8 | 3 | 2.8 |
| Measured value (g) of hardness of chocolate | 690 | 1210 | 880 | 900 | 890 |

(Unit: part by weight)
*1 and *2Ester S770 and Ester S370 produced by Mitsubishi Chemical Industries Co., Ltd.
*3WILSURF TF60 produced by Nippon Oil & Fats Co., Ltd.
*4L-300 produced by Riken Vitamin Co., Ltd.

Examples 13, 14, 15 and Comparative Example 2

Preparation of Fat

Preparation of the respective vegetable fat parts was carried out in accordance with the following compositions. The compositions of the fats, analysis results of the triglyceride compositions using an HPLC method, and the contents of trans acid and C12 are shown in Table 9.

TABLE 9

|  | Blending amount (part) of vegetable fat | | Analysis value (%) | | | | | | | |
|---|---|---|---|---|---|---|---|---|---|---|
|  | Edible fat A | Edible fat B | SSS | S2U | SU2 | UUU | OOO | PPP + P2St | Trans acid | C12 |
| Example 13 | 36.3 | 63.7 | 8.0 | 15.0 | 19.1 | 46.7 | 41.6 | 7.6 | 1% or less | — |
| Example 14 | 26.3 | 69.6 | 6.8 | 11.1 | 18.1 | 50.5 | 45.1 | 5.9 |  | — |
| Example 15 | 23.0 | 77.0 | 5.1 | 9.8 | 18.7 | 55.7 | 49.6 | 4.8 |  | — |
| Comparative Example 2 | 15.0 | 85.0 | 3.3 | 6.7 | 18.4 | 61.1 | 54.4 | 3.1 |  | — |

(Trial Preparation of Chocolate)

Next, a trial preparation of chocolate was carried out by a conventional method in accordance with the following compositions.

The trial preparation was carried out in which Examples 13, 14, 15 and Comparative Example 2 had the same composition except for a difference in the blended vegetable fat part. In Examples 13, 14, 15 and Comparative Example 2, the blending amount of a randomly transesterified fat as the fat having a rising melting point of 35° C. or higher was less than 60 parts by weight and a fat being liquid at room temperature was contained.

The chocolate obtained by the trial preparation was coated on a bread and evaluated in accordance with the aforementioned evaluation method.

Both Examples 13 and 14 that contained 6.0 wt % or more of SSS quickly hardened at normal temperature, and had good appearance and meltability in the mouth. In addition, they had less peeling when eaten, and had no problem with heat resistance. Example 15 that contained 5.1 wt % of SSS quickly hardened at normal temperature, and had good appearance and meltability in the mouth. However, Example 15 was slightly inferior to Examples 13 and 14 in heat resistance.

Comparative Example 2 that contained 3.3 wt % of SSS hardly hardened at normal temperature and had low heat resistance, and was thus unsuitable for coating use. The chocolate compositions and the evaluation results are summarized in Table 10.

TABLE 10

|  | Example 13 | Example 14 | Example 15 | Comparative Example 2 |
|---|---|---|---|---|
| Cocoa | 12.9 | ← | ← | ← |
| Cacao mass | 3 | ← | ← | ← |
| Sugar | 42.1 | ← | ← | ← |
| Skimmed milk powder | 5.7 | ← | ← | ← |
| Lactose | 11.4 | ← | ← | ← |
| Vegetable fat | 24.9 | ← | ← | ← |
| Lecithin | 0.4 | ← | ← | ← |
| Sucrose fatty acid ester (HLB = 7)*1 | 0.2 | ← | ← | ← |
| Flavoring agent | 0.053 | ← | ← | ← |
| Evaluation of drying property | 3 (5 min) | 3 (5 min) | 3 (6 min) | 2 (13 min) |
| Evaluation of appearance | 3 | 3 | 3 | 1 |
| Evaluation of meltability in the mouth | 3 | 3 | 3 | 3 |

TABLE 10-continued

|  | Example 13 | Example 14 | Example 15 | Comparative Example 2 |
|---|---|---|---|---|
| Evaluation of peeling resistance | 3 | 3 | 3 | 3 |
| Evaluation of heat resistance | 3 | 3 | 2 | 1 |
| Overall evaluation (average) | 3 | 3 | 2.8 | 2 |

(Unit: part by weight)
*1Ester S770 produced by Mitsubishi Chemical Industries Co., Ltd.

Preparation Example of Fat Composition for Chocolate Coating

The fat composition for chocolate coating according to the invention can be obtained by mixing 50 parts by weight of Edible fat B, 40 parts by weight of palm stearin (having an iodine value of 31.6) and 10 parts by weight of palm oil together, wherein the mixture undergoes no processing such as transesterification, and contains the palm stearin (having an iodine value of 31.6) as the fat having a rising melting point of 35° C. or higher and Edible fat B as the fat being liquid at room temperature. Analysis values of the palm stearin are shown in Table 11; analysis results of the triglyceride composition using an HPLC method, and the contents of trans acid and C12 of the fat composition for chocolate coating are shown in Table 12.

TABLE 11

| C12 | C14 | C16 | C18 | C18:1 | C18:2 | C18:3 | C20 | C22 | C24 | Rising melting point | Iodine value |
|---|---|---|---|---|---|---|---|---|---|---|---|
| 0.2 | 1.3 | 63.2 | 5.0 | 25.0 | 5.0 | 0.3 | — | — | — | 53.4° C. | 31.6 |

TABLE 12

| SSS | S2U | SU2 | UUU | OOO | PPP + P2St | Trans acid | C12 |
|---|---|---|---|---|---|---|---|
| 13.3 | 17.3 | 15.6 | 37.1 | 33.6 | 13.0 | 1% or less | — |

The fat composition for chocolate coating in the preparation example satisfies all the following requirements (a) to (d):
(a) an SSS content of 6 to 15 wt %;
(b) an S2U content of 7 to 35 wt %;
(c) an SU2+UUU content of 40 to 70 wt %, an SU2 content of 30 wt % or less, a UUU content of 10 wt % or more, and an OOO content of 5 wt % or more; and
(d) a PPP+P2St content of 70 parts by weight or more relative to 100 parts by weight of SSS.

INDUSTRIAL APPLICABILITY

According to the invention, unlike a conventional fat composition for chocolate coating, a composite food having the functions required for coating use while novel and having a soft texture can be provided by a simple method.

What is claimed is:
1. A fat composition for chocolate coating that contains a fat, wherein the fat satisfies all the following requirements (A) to (F) and having a rising melting point of 35° C. or higher, and the fat composition satisfies all the following requirements (a) to (d):
(A) a content of C8-12 saturated fatty acids in a constituent fatty acid composition of the fat being 3 wt % or less with respect to a total weight of the fat;
(B) a content of C14-20 saturated fatty acids in the constituent fatty acid composition of the fat being 40 to 90 wt % with respect to a total weight of the fat;
(C) a content of C16-20 unsaturated fatty acids in the constituent fatty acid composition of the fat being 10 to 60 wt % with respect to a total weight of the fat;
(D) a content of C8-22 saturated fatty acids in the constituent fatty acid composition of the fat being 48.6 to 69.1 wt % with respect to the total weight of the fat;
(E) a content of C16 saturated fatty acids and C18 saturated fatty acids in the constituent fatty acid composition of the fat being 90 parts by weight or more relative to a total of 100 parts by weight of C8-22 saturated fatty acids; and
(F) a content of trans fatty acids in the constituent fatty acid composition of the fat being 3 wt % or less with respect to the total weight of the fat,
(a) an SSS content of 6 to 15 wt % with respect to a total weight of the fat composition;
(b) an S2U content of 10 to 45 wt % with respect to the total weight of the fat composition;
(c) an SU2+UUU content of 40 to 70 wt % with respect to the total weight of the fat composition, wherein 5 wt % or more of UUU is OOO with respect to the total weight of the fat composition; and
(d) a PPP+P2St content of 70 parts by weight or more relative to 100 parts by weight of SSS,
wherein S represents a C16 or higher saturated fatty acid, U represents a C16 or higher unsaturated fatty acid, SSS represents a triglyceride in which three molecules of S are bound, S2U represents a triglyceride in which two molecules of S and one molecule of U are bound, SU2 represents a triglyceride in which one molecule of S and two molecules of U are bound, UUU represents a triglyceride in which three molecules of U are bound, P represents palmitic acid, St represents stearic acid, O represents oleic acid, PPP represents a triglyceride in which three molecules of P are bound, P2St represents a triglyceride in which two molecules of P and one molecule of St are bound, and OOO represents a triglyceride in which three molecules of O are bound,
wherein the fat having a rising melting point of 35° C. or higher comprises one kind or two kinds of randomly transesterified fats and a content of the randomly transesterified fat is 60 wt % or more.

2. The fat composition for chocolate coating according to claim 1, containing 0.1 to 3 mass % of an emulsifier having an HLB of 3 to 16.

3. The fat composition for chocolate coating according to claim 2, wherein the emulsifier having an HLB of 3 to 16 is at least one or more selected from a group consisting of sucrose fatty acid ester, sorbitan fatty acid ester, and polysorbate.

4. The fat composition for chocolate coating according to claim 1, containing the fat having a rising melting point of 35° C. or higher and a fat being liquid at room temperature.

5. The fat composition for chocolate coating according to claim 4, containing 0.1 to 3 mass % of an emulsifier having an HLB of 3 to 16.

6. The fat composition for chocolate coating according to claim 4, wherein the fat having a rising melting point of 35° C. or higher is a randomly transesterified fat.

7. The fat composition for chocolate coating according to claim 4, wherein the SU2 content in (c) is 30 wt % or less and the UUU content in (c) is 10 wt % or more with respect to the total weight of the fat composition.

8. The fat composition for chocolate coating according to claim 5, wherein the emulsifier having an HLB of 3 to 16 is at least one or more selected from a group consisting of sucrose fatty acid ester, sorbitan fatty acid ester, and polysorbate.

9. The fat composition for chocolate coating according to claim 1, wherein in a constituent fatty acid composition thereof, a content of trans fatty acids is 3 wt % or less, and a content of C8-12 saturated fatty acids is 3 wt % or less.

10. A coating chocolate using the fat composition for chocolate coating according to claim 1.

11. A composite food coated with the coating chocolate according to claim 10.

12. The composite food according to claim 11, wherein the composite food comprises confectionery or bakery products.

13. A method for improving adhesiveness between a coating chocolate and a composite food using the coating chocolate according to claim 10.

* * * * *